April 17, 1951 L. F. CURTIS 2,549,578

MAGNETOSTRICTIVE CONVERTER TIME DELAY DEVICE

Filed Dec. 30, 1947 2 Sheets-Sheet 1

INVENTOR.
LESLIE F. CURTIS

BY John A. Harvey

ATTORNEY

April 17, 1951 L. F. CURTIS 2,549,578

MAGNETOSTRICTIVE CONVERTER TIME DELAY DEVICE

Filed Dec. 30, 1947 2 Sheets-Sheet 2

INVENTOR.
LESLIE F. CURTIS

BY John A. Harvey

ATTORNEY

Patented Apr. 17, 1951 2,549,578

UNITED STATES PATENT OFFICE 2,549,578

MAGNETOSTRICTIVE CONVERTER TIME DELAY DEVICE

Leslie F. Curtis, Haydenville, Mass., assignor to Hazeltine Research, Inc., Chicago, Ill., a corporation of Illinois Application December 30, 1947, Serial No. 794,626

3 Claims. (Cl. 178—44)

Figure 1:
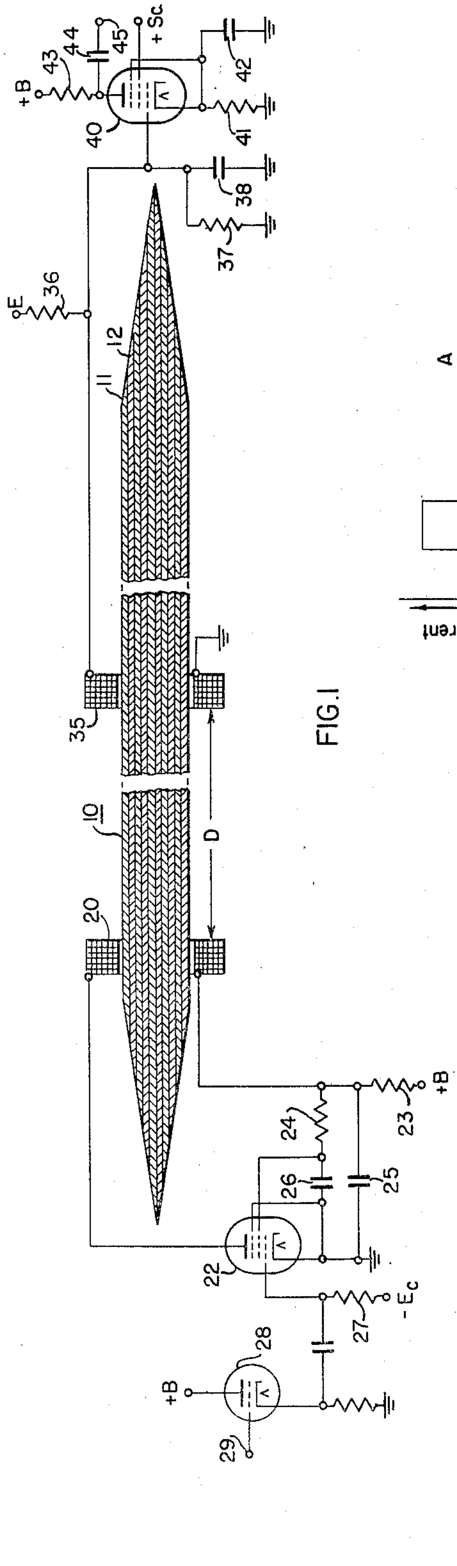

The present invention is directed to magnetostrictive converters for time-delay signal-translating devices of the magnetostrictive type. The expression "magnetostrictive converter," as used throughout the present specification and in the appended claims, is intended to mean a structure of magnetic material which exhibits the phenomenon of converting magnetic flux variations into traveling mechanical or stress waves, and vice versa.

A magnetostrictive device especially suited for translating pulse signals with an accurately selected time delay is described and claimed in Patent 2,526,229 granted October 17, 1950, to Alan Hazeltine, entitled "Magnetostrictive Signal-Translating Arrangement," and assigned to the same assignee as the present invention. In that device a laminated converter is employed, comprising a stack or pile of magnetostrictive laminations individually having a thickness approximately equal to twice the effective depth of magnetic-field penetration for electrical signals to be translated. At each end the converter is clamped to minimize reflection effects of the stress waves. An excitation winding is coupled magnetically with a first portion of the converter to develop a stress wave therein for propagation therealong and an induction winding is coupled magnetically to a second section, suitably spaced from the first-mentioned section. The induction winding responds to a changing flux produced by the stress wave to derive an induced electrical signal with a time delay related to the spacing of the first and second sections. When such a device is constructed to satisfy certain critical requirements fully discussed in the Hazeltine application, it translates pulse signals with an accurately determined time delay and supplies strong output pulses with sharply defined edges.

The instant invention is an improvement in the magnetostrictive converter of such time-delay devices and is especially valuable in minimizing reflection effects occasioned at the end portions of the laminations. In particular, a converter embodying the present invention may be utilized with or without the clamping arrangements heretofore relied upon to suppress reflection effects to tolerable limits.

It is an object of the present invention to provide a new and improved magnetostrictive converter for a time-delay signal-translating device of the magnetostrictive type.

It is another object of the invention to provide a magnetostrictive converter having an improved reflection characterisic and especially suited for use in a time-delay signal-translating device.

It is a specific object of the invention to provide a new and improved laminated magnetostrictive converter which inherently reduces reflection phenomenon and which is particularly useful in time-delay signal-translating arrangements.

It is a still further object of the invention to provide a magnetostrictive signal-translating device including a laminated magnetostrictive converter featuring an improved reflection characteristic.

In accordance with one feature of the invention, a magnetostrictive time-delay signal-translating device comprising a magnetostrictive converter including a plurality of magnetostrictive elements arranged in parallel-excitation relation with the terminal portions of the elements at one end of the converter displaced with respect to one another along the path of stress-wave propagation. The device also includes an excitation winding coupled magnetically with the converter for simultaneously establishing a stress wave in each element thereof for propagation therealong, and an induction winding coupled magnetically with the converter for deriving, in response to the propagation of stress waves along the elements, a desired induced signal and an undesired ringing component following the desired signal. The displacement of the terminal portions of the elements is so selected relative to the duration and the wave form of the stress wave established in the elements that reflections of the stress wave at the terminal portions induce in the induction winding a succession of similar and at least partially mutually cancelling delayed signals. The excitation winding is so displaced from the terminal portion of one of the elements at one end of the converter that the reflection of the stress wave at the terminal portion induces in the induction winding a delayed signal substantially in time coincidence with but of opposite polarity with respect to the undesired ringing component for at least reducing the amplitude of the undesired ringing component.

For a better understanding of the present invention, together with other and further objects thereof, reference is had to the following description taken in connection with the accompanying drawings, and its scope will be pointed out in the appended claims.

Figure 3:
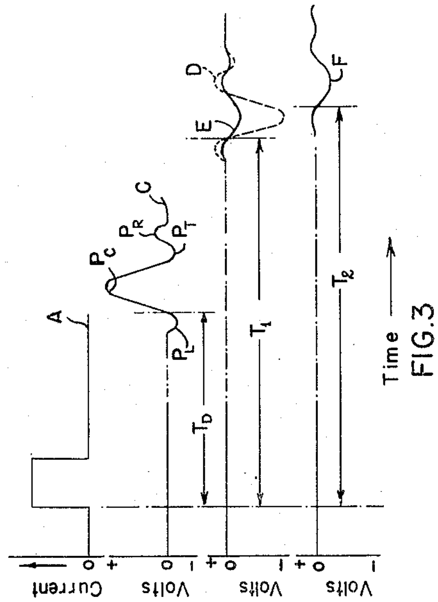
Figure 2A:
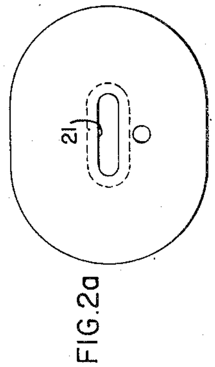
Figure 2B:
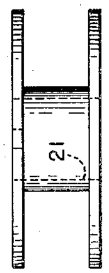
Figure 5:
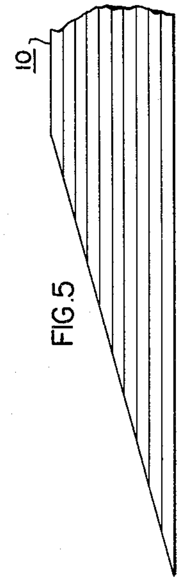

In the drawings, Fig. 1 is a schematic representation of a time-delay signal-translating device of the magnetostrictive type including a converter embodying the present invention; Figs. 2a and 2b are side and elevational views of a coil form which may be utilized in constructing the device of Fig. 1; Fig. 3 comprises a series of curves utilized in explaining certain operating characteristics of the signal-translating device of Fig. 1; and Figs. 4, 5, 6, 7, and 8, represent further modifications of a magnetostrictive converter in accordance with the invention.

Referring now more particularly to Fig. 1, the time-delay signal-translating device there represented may be used to translate applied signals of a variety of wave forms, including sinusoidal signals, but it is especially useful for translating pulse signals with a precisely selected time delay and will be particularly described in that connection. The arrangement comprises a laminated magnetostrictive converter 10 including a plurality of magnetostrictive elements arranged in parallel-excitation relation. The expression "parallel-excitation relation" is here used to mean a relationship of the several magnetostrictive elements within the converter 10 such that the elements may be simultaneously subjected to the influence of an excitation winding, to be described presently, in order that stress waves may be concurrently established in each of the elements for propagation therealong. The converter 10 may be constructed of elements having any of a variety of cross-sectional configurations arranged one on top of the other or in a cluster. For example, the elements may be flat strips or may be V-shaped or curvilinear in cross section. In the particular construction illustrated, the converter comprises a series of flat strips of magnetostrictive material superposed upon one another to define a stack and to provide a laminated magnetostrictive converter. For convenience, reference characters 11 and 12 have been assigned to only the top two such magnetostrictive elements. Each such element is a single homogeneous strip of material exhibiting strong magnetostrictive properties, for example, nickel or a nickel-iron alloy. If desired, the several laminations may be electrically insulated from one another by coating each with a suitable insulating compound or by interleaving thin strips of insulating material.

In order that magnetic fluxes associated with magnetostrictive conversion may penetrate the converter 10 so as to make full use of its cross section, the thickness of each magnetostrictive lamination is selected to be of the order of twice the effective depth of magnetic-field penetration for electrical signals to be translated. The depth of penetration depends on the conductivity and permeability of the laminations as well as the signal frequency and may be computed in accordance with well-known formulas. The permeability referred to is the reversible or alternating-current permeability rather than the direct-current permeability, and the effective frequency for pulse translation may be taken as that corresponding to a period equal to twice the pulse width or duration. The width of each lamination is large compared to its thickness to facilitate handling and is not critical for short delay times. The influence of the width in installations where long time delays are desired is fully discussed and claimed in United States Letters Patent No. 2,455,740, granted December 7, 1948, entitled "Magnetostrictive Time-Delay Device," and assigned to the same assignee as the present invention. The over-all length of the converter 10 is not critical and is usually chosen in accordance with the requirements of the installation. For this reason the representation of Fig. 1 shows an indeterminate length for the converter 10. However, the relative lengths of the several laminations are material in defining the end terminations of the converter 10 as will be explained more fully hereinafter.

An excitation winding 20 encircles a transverse section of the converter 10 and is coupled magnetically therewith for simultaneously establishing a stress wave in each lamination of the converter for propagation therealong. To reduce undesirable electrical oscillations in the winding, especially when translating short pulses having a duration of the order of one microsecond, the excitation winding 20 advantageously is made resonant at a frequency corresponding to a period equal to, or of the order of, twice the duration of the signal pulse to be translated. For optimum response of the time-delay arrangement, it is desirable that the section of the converter 10 which is primarily subject to the magnetizing field of the winding 20 represent a propagation time equal to, but not exceeding, the duration of the excitation pulse supplied to that winding. To that end, pole pieces may be associated with the excitation winding to limit the region of its magnetizing effect on the converter 10 as described in applicant's copending application referred to previously. For some installations, however, it may be sufficient to employ a coil form of the type represented in Figs. 2a and 2b.

As clearly represented in Figs. 2a and 2b, the coil form is in the nature of a spool, having flange pieces defining a winding space in which the winding may be wound and further having a central aperture 21 through which the laminations of the converter 10 may project. The coil form may be fabricated from an insulating material and the aperture 21 is preferably shaped to conform closely with the cross-sectional configuration of the converter, providing only a sufficient separation between the form and the converter to facilitate displacing the winding along the length of the converter.

A pulse-translating circuit, including the excitation winding 20, comprises means for supplying excitation current to that winding. This circuit includes a pentode vacuum tube 22 having a grounded cathode and having an anode coupled through the excitation winding 20 and a decoupling resistor 23 to a source of space current, indicated +B. The suppressor electrode of the tube 22 is directly connected to its cathode and the screen electrode is coupled through a potential-dropping resistor 24 and the resistor 23 to the source +B. Condensers 25 and 26 are by-pass condensers for further decoupling the anode and screen electrodes from one another and from the source +B. A bias source $-E_c$ is coupled to the control electrode of the tube 22 through a resistor 27 and maintains the tube near or below anode-current cutoff in the absence of applied signals. The direct-current component of the anode-current pulses of this tube traverses the winding 20 and is usually sufficient to establish a polarizing magnetic flux in the associated section of the converter 10. If desired, an additional value of direct current may be supplied to this winding for polarizing purposes and may be obtained by having the tube 22 normally slightly conductive as by selection of the value of the biasing source $-E_c$. A conventional cathode-follower circuit, including the triode vacuum tube 28, provides means for supplying signal pulses from an input terminal 29 to the input circuit of the tube 22.

An induction winding 35 encircles and is magnetically coupled to a second transverse section of the converter 10 for deriving an induced signal in response to the propagation of stress waves along the magnetostrictive laminations. The induction winding 35 may conveniently have the same construction as the excitation winding 20 and the spacing, indicated by the dimension line D, between these windings is related to the time delay to be introduced in the signal translation. By having at least one of the windings displaceable along the converter, the distance D may be readily and precisely selected in accordance with particular operating requirements. Preferably, the induction winding 35 has substantially no direct magnetic coupling with the excitation winding 20 in order that the response of the induction winding may result primarily only from the propagation of stress waves along the converter. While well-known shielding structures may surround the windings to minimize direct coupling therebetween, the coupling assembly of applicant's aforementioned copending application is particularly suitable for providing the desired shield effect.

The induction winding 35 may be self-resonant at the same frequency as the excitation winding 20 and is associated with means for establishing a polarizing magnetic flux in the section of the converter with which it is magnetically coupled. The polarizing means may be a permanent magnet, but, as shown, comprises a source of unidirectional potential indicated as E and a resistor 36 connected in a direct-current circuit with the induction winding. A wave-shaping network, including a damping resistor 37 and a parallel-connected condenser 38, is connected across the induction winding 35 to reduce the amplitude of electrical oscillations or ringing effects in that winding. Instead of using a damping resistor, it is possible to construct the induction winding of finer wire than that utilized in the excitation winding. The use of finer wire increases the self-damping or loading of the induction winding. Additionally, the length of the section of the converter 10 subject to the magnetizing effect of the induction winding should preferably be equal to that of the corresponding section of the converter with which the excitation winding 20 is associated. As explained in the above-mentioned Hazeltine patent, the length of each such section is, preferably, to represent a propagation time not exceeding the duration of the translated pulses.

The input electrodes of a wave-signal repeater, including a pentode vacuum tube 40, are connected across the induction winding 35 so that this repeater constitutes means coupled to the winding for supplying the induced signal to a utilizing device. The cathode of the tube 40 is grounded through a resistor 41 by-passed by a condenser 42. The anode of the tube is coupled to a source of space current +B through an anode load resistor 43 and a condenser 44 couples an output terminal 45 to the anode circuit of the tube.

In the operation of the described arrangement, a signal of pulse wave form is applied to the input terminal 29 with such polarity as to be translated by the tube 22 to apply a pulse of excitation current to the excitation winding 20. The flow of exciting current through the winding 20 varies the flux in the local portion of the converter 10 which is influenced by the excitation winding and establishes in that portion a longitudinal mechanical stress, such as a contraction. This stress creates two similar longitudinal stress waves or mechanical wave pulses which travel in opposite directions longitudinally of the converter 10. The stress wave traveling to the left of the excitation winding 20 is able to influence the induction winding 35 only after it has been reflected at the left-hand termination of the converter 10. The effect of this pulse will be neglected for the time being. The stress wave which travels in the opposite direction, that is, in the direction of the induction winding 35, may be considered to be the useful one. It arrives at the section of the converter which is subject to the magnetizing effect of the induction winding 35 after a time interval $T_D$ determined by the spacing D between the windings and the velocity of stress-wave propagation along the converter. As the stress wave travels through that section of the converter, the permeability is modified and the flux established in that section by the polarizing circuit is changed. The change in flux induces a signal in the induction winding 35 which is applied to the input electrodes of the repeater 40 and is translated by the latter to the output terminal 45.

A more exhaustive treatment of the translation of signals through a magnetostrictive arrangement of the type under consideration may be found in the above-mentioned patent of Alan Hazeltine. The Hazeltine patent also explains the significance of relating the lengths of the sections of the converter subject to the magnetizing effects of the excitation and induction windings to one another and to the duration of the translated pulse. However, for the purposes of adequately understanding the present invention it is sufficient to understand that the pulse of excitation current, such as represented by curve A of Fig. 3, causes an induced signal of the type indicated by curve C to be obtained from the induction winding 35 and to be supplied to the output terminal 45.

The output signal has a pulse portion $P_C$ of a given polarity which may be isolated by well-known limiting, clipping, or wave-shaping processes and utilized. In the usual installation, it is preceded and followed by leading and trailing pulse components $P_L$ and $P_T$ which are of opposite polarity to the component $P_C$. Oscillations generated in the induction winding 35 also frequently give rise to a further trailing component $P_R$ of the same polarity as the component $P_T$. The time delay $T_D$ of the useful pulse component $P_C$ relative to the excitation pulse is indicated in Fig. 3.

Returning now to a further consideration of the stress wave which is propagated to the end of the converter 10 nearest the excitation winding 20, it has been determined that this pulse is reflected with a polarity reversal if that end of the converter is not clamped. Should the laminations of the converter 10 be of the same length and have coincident or transversely aligned terminations, it is apparent that a multiplicity of concurrent reflections is encountered because the excitation winding 20 simultaneously establishes similar stress waves in each of the laminations for propagation therealong. The reflected stress waves, being of the same polarity and occurring in time coincidence, produce components of induced voltage in the induction winding 35 which are additive. For that case, a delayed induced signal of the type indicated by the broken-line curve D of Fig. 3 is induced in the induction winding and applied to the input electrodes of the repeater 40 with a time delay $T_1$. Time delay $T_1$ represents the delay time $T_D$ between the windings 20 and 35 plus twice the propagation time represented by the length of the converter between the excitation winding 20 and the unclamped end to the left of the winding 20. As shown by the curve D, this delayed signal, which is occasioned by the reflecting properties of the unclamped end of the converter, is a mirror image of the direct signal obtained from the induction winding 35 and has essentially the same amplitude. By providing end terminations for the converter in accordance with the present invention, the amplitude of the delayed signal resulting from reflection effects is very appreciably reduced to avoid any undesired response of the utilizing device to that signal.

In the embodiment of Fig. 1 the terminal portions of the individual laminations at the end of the converter immediately adjacent to the excitation winding 20 are displaced with respect to one another along the path of stress-wave propagation which is predominantly in the direction of the longitudinal axis of the converter. More specifically, the laminations individually have beveled end portions and they are arranged with their beveled ends in alignment to provide smoothly tapered terminations at both ends of the converter as clearly shown in Fig. 1. In view of this tapered construction, the top lamination 11 terminates before the next succeeding lamination 12 and consequently a reflection occasioned at the end of lamination 11 occurs before any reflection produced at the corresponding end of the lamination 12. For that reason, the reflections are dispersed and a series of reflected stress waves occur, displaced in time relative one to the other in accordance with the displacement along the path of stress-wave propagation of the end portions of the laminations. The full-line curve E of Fig. 3 denotes the delayed signal output of the induction winding 35 in response to the reflection of a stress wave at the left end of the lamination 11. Comparing this with curve D demonstrates that the signal output from the induction winding 35 occasioned by reflection phenomenon is very materially reduced.

The signal represented by curve F of Fig. 3 signifies the response of the induction winding 35 to the corresponding reflection of the stress wave propagated along the lamination 12. The signal of curve F is delayed relative to the excitation pulse by the interval $T_2$ which is greater than the delay time $T_1$ of the reflection from the uppermost lamination 11 by the amount of overlap of the laminations 11 and 12 at the end of the converter adjacent the excitation winding 20. In other words, instead of realizing the single output signal shown by curve D resulting from simultaneous in-phase reflections at the end portions of the several laminations, a series of output signals is produced, occurring in a time sequence determined by the extent of overlap of the several laminations. Each component of that series is very much reduced in amplitude, having a value of the order of 1/N times the peak amplitude of the signal of curve D, where N equals the number of staggered or overlapped laminations in the converter.

In addition to dispersing the reflection effects in the manner just described, the tapered or staggered termination of the converter may also achieve a further reduction in that signal output of the device which results from the reflection of stress waves. This is accomplished by utilizing the principle of wave interference. Referring again to curves E and F, it is seen that the signals there represented have positive and negative polarity components. The delay times $T_1$ and $T_2$ may be so selected that opposite polarity portions of those signals occur in time coincidence partially to cancel one another. For that purpose, the displacement of the end portions of the laminations is so selected relative to the duration and wave form of the stress waves established in each lamination as to have the series of reflected stress waves in proper time relation.

In the arrangement of Fig. 1, both ends of the converter 10 are tapered because reflections may arise at each end. Utilizing the principle of staggered or tapered terminations reduces the intensity of in-phase reflections occasioned at each end of the converter in response to stress waves propagated along its laminations. The expression "in-phase reflections" is intended to describe reflections which occur in time coincidence and with the same polarity so that their effects on the induction winding 35 are additive.

Figure 4:
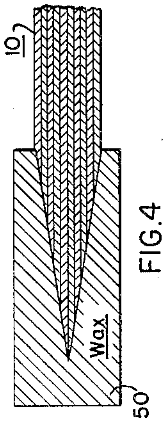

It has been found that sound-absorbing material may be associated with the tapered ends of the converter to provide a still further reduction in reflection effects. Thus, as shown in Fig. 4, either or both ends of the tapered converter 10 may be enclosed in a sound-absorbing material 50. It is convenient to use wax or other nonresilient material for the termination, and an improvement is realized because the dispersed reflections obtained with the tapered construction reduce the amplitude of the sound energy which the absorbing material is required to reduce at any given time. The reduction is brought about by the fact that there is a series of low-intensity reflections from the end of the converter as distinguished from a single high-intensity reflection incident to the use of blunt or sheared ends.

The taper provided at the terminal portions of the converter illustrated in Figs. 1 and 4 is symmetrical relative to the median plane of the converter. Additional freedom from reflections may be achieved through the construction represented in Fig. 5 where the taper at the end portion is more of wedge-shaped configuration in that it is continuous and in the same sense from lamination to lamination.

With each of the arrangements thus far described, it is desirable to restrain the ends of the laminations against movement. This may be accomplished by cementing the ends of the laminations together or through the use of any suitable adhesive with which the end portions of the laminations may be coated.

It is not necessary that the ends of the laminations be beveled to provide the tapered termination for the converter. If desired, each lamination may be sheared at its ends and a step type of construction, which is essentially the same as a taper, may be provided in the manner illustrated in Fig. 6. In this case it is preferable that the stagger or overlap portion, represented by dimension line *d*, for each lamination be uniform. The topmost lamination 11' may have at each end an L-shaped extension which is mechanically and electrically secured to a conductive supporting surface 51. In this form, the lengths of the laminations decrease from the top to the bottom surface of the converter and the grounded lamination 11' may be relied upon to restrain the corresponding ends of the other laminations. The spacing *e* of the lowest lamination 13 from the excitation winding 20 may be selected so that the reflection occurring at that lamination may induce a signal in the induction winding 35 in time coincidence with but with opposite polarity relative to the overshoot component $P_R$ at the trailing edge of the direct output signal shown by curve C. This permits the trailing edge of the direct output signal to be free from undesired ringing components of the same polarity as the desired pulse $P_C$ or at least enables the amplitude of such ringing components to be limited to a tolerable value.

In using a stack of 10 laminations having widths of 1/8'' and a thickness of 2 thousandths inch to translate rectangular wave pulses having a duration within the range of 1 to 2½ microseconds, the overlap or stagger dimension *d* is approximately 3/16''. The dimension *e* may be 1/16'' and the axial lengths of the windings 20 and 35 may be approximately 1/8''. Where the windings are accommodated by coil forms of the type shown in Figs. 2*a* and 2*b*, the spacing between the flanges is 1/8'' and the dimensions of the slot 21 are approximately 0.125''×.031''. The distance from the top surface of the winding spool to the slot 21 may be 0.02'' and the thickness of the flanges may be approximately 0.02''.

Figure 7:
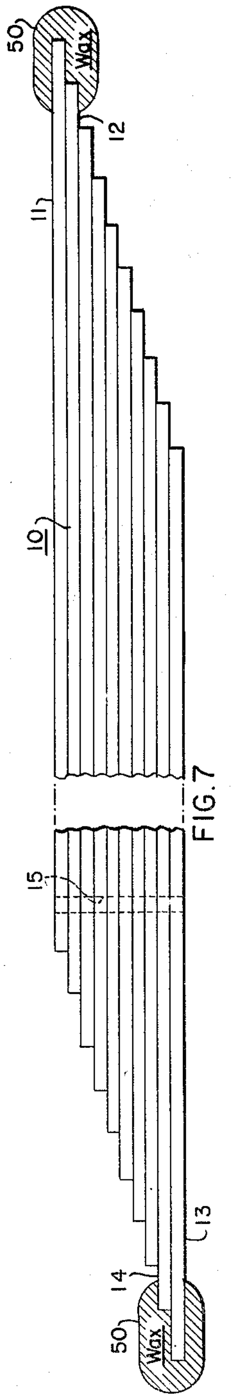

The form of the converter 10 illustrated in Fig. 7 features the use of laminations of approximately the same length. Again, they are arranged in superposed relation with their corresponding ends displaced with respect to one another along the direction of stress-wave propagation, producing stepped or tapered terminations at both ends of the converter. The top pair of laminations 11 and 12 as well as the bottom pair 13 and 14 project the greatest amounts from the stack and their end portions are enclosed in wax 50, further to reduce in-phase reflections at the terminal portions of the converter.

Figure 8:
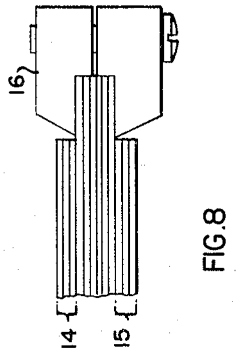
Figure 6:
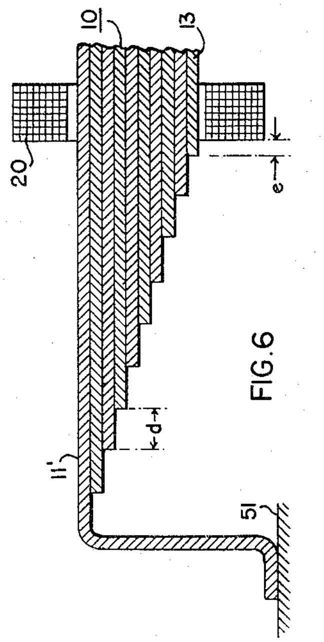

While a reversed polarity reflection is produced at an unclamped end of the laminations of the converter 10, a reflection without a polarity reversal occurs in the presence of a rigid clamp applied to the terminal portions of the laminations. These opposing types of reflections may be utilized to reduce the net response to reflected stress waves. For example, as shown in the embodiment of Fig. 8, a portion of the laminations may have unclamped terminations thereby to produce reversed polarity reflections of stress waves propagated therealong. The unclamped laminations are identified by the brackets 14 and 15 while the remaining laminations extend into a metal clamp 16 positioned immediately adjacent the ends of the unclamped laminations. The clamped laminations provide reflections of the same polarity as the incident stress waves which at least partially cancel the reversed polarity reflections produced by the unclamped laminations. It has been convenient here to consider cancellation of the reflected stress waves but, in fact, the cancellation is of the wave signals induced in the induction winding 35 by the reflected stress waves.

Each of the described arrangements includes a magnetostrictive converter which is simple and inexpensive to construct and yet one which exhibits improved freedom from undesirable reflection effects. The staggered or tapered relationship of the several laminations disperses the points of stress-wave reflection and causes the reflected stress waves to occur in a displaced time sequence and with a very low amplitude as compared with the direct stress wave which produces the desired direct output signal from the induction winding 35. Additionally, dispersing the points of reflection permits the sound-absorbing clamping arrangements to be more effective because they are called upon to suppress reflected stress waves of reduced intensity. The converter constructions may alternatively be viewed in terms of impedance relations. The end of the converter or any of its component parts may be considered to constitute an impedance discontinuity because it causes reflection of an incident stress wave. Dispersion of such impedance discontinuities along the path of stress-wave propagation, by tapering in the manner of Figs. 1, 4, and 5 or by the stepped construction of Figs. 6 and 7, disperses the reflections and improves the operation of the converter in that it minimizes the output signal attributable to reflection phenomenon.

Viewing the invention in the light of impedance functions clearly demonstrates its wide application. It may be shown, for example, that an impedance discontinuity may be created by forming a step or cutting a hole in a lamination, as indicated at 15 in Fig. 7. Providing one or more such discontinuities in a lamination permits the advantages of dispersed reflections to be obtained. Hence, it will be understood that the teachings of this invention may be employed in constructing magnetostrictive converters that utilize only a single magnetostrictive element or a plurality of such elements.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A magnetostrictive time-delay signal-translating device comprising: a magnetostrictive converter including a plurality of magnetostrictive elements arranged in parallel-excitation relation with the terminal portions of said elements at one end of said converter displaced with respect to one another along the path of stress-wave propagation; an excitation winding coupled magnetically with said converter for simultaneously establishing a stress wave in each element thereof for propagation therealong; and an induction winding coupled magnetically with said converter for deriving, in response to the propagation of stress waves along said elements, a desired induced signal and an undesired ringing component following said desired signal; the displacement of said terminal portions of said elements being uniform and so selected relative to the duration and wave form of the stress wave established in said elements that reflections of said stress wave at said terminal portions induce in said induction winding a succession of similar and at least partially mutually cancelling delayed signals; said excitation winding being so displaced from the terminal portion of one of said elements at said one end of said converter that reflections of said stress wave at said terminal portion induces in said induction winding a delayed signal substantially in time coincidence with but of opposite polarity with respect to said undesired ringing component for at least reducing the amplitude of said undesired ringing component.

2. A magnetostrictive time-delay signal-translating device comprising: a magnetostrictive converter including a plurality of magnetostrictive elements arranged in parallel-excitation relation with the terminal portions of said elements at one end of said converter displaced with respect to one another along the path of stress-wave propagation, said elements individually having a thickness of the order of twice the effective depth of penetration for electrical signals to be translated and having a width large compared to the thickness; and excitation winding coupled magnetically with said converter for simultaneously establishing a stress wave in each element thereof for propagation therealong; and an induction winding coupled magnetically with said converter for deriving, in response to the propagation of stress waves along said elements, a desired induced signal and an undesired ringing component following said desired signal; the displacement of said terminal portions of said elements being so selected relative to the duration and wave form of the stress wave established in said elements that reflections of said stress wave at said terminal portions induce in said induction winding a succession of similar and at least partially mutually cancelling delayed signals; said excitation winding being so displaced from the terminal portion of one of said elements at said one end of said converter that reflections of said stress wave at said terminal portion induces in said induction winding a delayed signal substantially in time coincidence with but of opposite polarity with respect to said undesired ringing component for at least reducing the amplitude of said undesired ringing component.

3. A magnetostrictive time-delay signal-translating device comprising: a magnetostrictive converter including a plurality of magnetostrictive elements arranged in parallel-excitation relation with the terminal portions of said elements at one end of said converter displaced with respect to one another along the path of stress-wave propagation; an excitation winding coupled magnetically with said converter for simultaneously establishing a stress wave in each element thereof for propagation therealong; and an induction winding coupled magnetically with said converter for deriving, in response to the propagation of stress waves along said elements, a desired induced signal and an undesired ringing component following said desired signal; the displacement of said terminal portions of said elements being so selected relative to the duration and wave form of the stress wave established in said elements that reflections of said stress wave at said terminal portions induce in said induction winding a succession of similar and at least partially mutually cancelling delayed signals; said excitation winding being so displaced from the terminal portion of one of said elements at said one end of said converter that the reflection of said stress wave at said terminal portion induces in said induction winding a delayed signal in substantially time coincidence with but of opposite polarity with respect to said undesired ringing component for at least reducing the amplitude of said undesired ringing component.

LESLIE F. CURTIS.

REFERENCES CITED

The following references are of record in the file of this patent:

UNITED STATES PATENTS

| Number | Name | Date |
|---|---|---|
| 2,318,417 | Phelps | May 4, 1943 |
| 2,328,496 | Rocard | Aug. 31, 1943 |
| 2,401,094 | Nicholson | May 28, 1946 |
| 2,455,740 | Curtis | Dec. 7, 1948 |